US005621286A

United States Patent [19]

Toujou et al.

[11] Patent Number: 5,621,286

[45] Date of Patent: Apr. 15, 1997

[54] COLOR CATHODE RAY TUBE HAVING IMPROVED FOCUS

[75] Inventors: Tsutomu Toujou; Shinichi Kato; Shouji Shirai, all of Mobara, Japan

[73] Assignee: Hitachi, Ltd., Tokyo, Japan

[21] Appl. No.: 444,744

[22] Filed: May 19, 1995

[30] Foreign Application Priority Data

May 23, 1994 [JP] Japan .................................... 6-108480

[51] Int. Cl.$^6$ ................................ G01S 3/16; G01S 3/28

[52] U.S. Cl. ......................... 315/382.1; 315/14; 313/414; 313/449

[58] Field of Search ................................ 315/14, 15, 382, 315/382.1; 313/414, 449

[56] References Cited

U.S. PATENT DOCUMENTS 5,113,112 5/1992 Shimoma et al. ...................... 313/412

5,449,983 9/1995 Sugawara et al. ...................... 315/382

5,523,648 6/1996 Son et al. ............................... 313/414

*Primary Examiner*—Theodore M. Blum

*Attorney, Agent, or Firm*—Antonelli, Terry, Stout & Kraus, LLP

[57] ABSTRACT

A color cathode ray tube includes an electron beam generating source, a first accelerating electrode, a focus electrode, and a second accelerating electrode, for focusing an electron beam onto the phosphor screen. The length of the focus electrode is equal to or larger than two times the diameter of the main lens, and the highest voltage is applied on the first accelerating electrode and the second accelerating electrode, and a voltage lower than the highest voltage is applied on the focus electrode, and the length of the first accelerating electrode is within the range from about 0.4 to 2 times the diameter of the electron beam passage aperture formed in the surface of the first accelerating electrode on the side of the electron beam generating source.

9 Claims, 13 Drawing Sheets

COLOR CATHODE RAY TUBE HAVING IMPROVED FOCUS

BACKGROUND OF THE INVENTION

The present invention relates to a cathode ray tube and more particularly to a color cathode ray tube including an electron gun having an electron lens by which the focus characteristic in a small beam current region is improved. A cathode ray tube which is used for color image display and color monitor (hereinafter referred to as a color cathode ray tube) includes a vacuum envelope comprising a panel portion which is a display screen, a neck portion for housing an electron gun and a funnel portion for connecting the panel portion and neck portion. In the funnel portion, a deflection device for scanning an electron beam emitted from the electron gun on the phosphor screen coated on the inner surface of the panel is mounted.

The electron gun housed in the neck portion comprises various electrodes such as a cathode, a control grid, a focus electrode, and an accelerating electrode, modulates an electron beam from the cathode by a signal applied on the control grid, shapes it into one having a required sectional shape and energizes it via the focus electrode and the accelerating electrode, and makes it impinge onto the phosphor screen.

The electron beam is deflected in two horizontal and vertical directions by the deflection device installed around the funnel portion on the way from the electron gun to the phosphor screen and forms an image on the phosphor screen.

As a model of this kind of electron gun, for example, Japanese Patent Application Laid-Open SHO 53-51958 discloses an electron gun comprising a first accelerating electrode, a focus electrode, and a second accelerating electrode toward the phosphor screen in the order named.

For example, FIGS. 17 and 18 are drawings for comparison of structures of two electron guns in terms of focus voltage application scheme and they are axial cross sectional views of in-line type electron guns viewed in a direction of the in-line arrangement. FIG. 17 shows a fixed focus voltage type and FIG. 18 shows a dynamic focus voltage type.

In FIGS. 17 and 18, a numeral 01 indicates a first electrode means for generating an electron beam and directing the electron beam toward the phosphor screen, 02 a second electrode means which constitutes a main lens for focusing the electron beam onto the phosphor screen, 03 a cathode, 04 the first grid, 05 the second grid, 06 a first accelerating electrode (the third grid), 07 a focus electrode (the fourth grid), 07-1 a first member of the focus electrode, 07-2 a second member of the focus electrode, 07-3 an electrode plate, 08 a second accelerating electrode (the fifth grid), 08-1 an electrode plate, and 09 a shield cup.

In FIG. 18, a numeral 07-4 indicates an electrode plate and 07-5 indicates a correction electrode plate.

In FIG. 17, the first electrode means 01 comprises the cathode 3, the first grid 04, and the second grid 05 and the second electrode means 02 comprises the first accelerating electrode 06, the first member of focus electrode 07-1, the second member of focus electrode 07-2, the electrode plate 07-3, the second accelerating electrode 08, and the electrode plate 08-1.

In FIG. 18, the first electrode means 01 comprises the cathode 3, the first grid 04, and the second grid 05 and the second electrode means 02 comprises the first accelerating electrode 06, the first member of focus electrode 07-1, the second member of focus electrode 07-2, the electrode plate 07-3, the electrode plate 07-4, the correction electrode plate 07-5, the second accelerating electrode 08, and the electrode plate 08-1.

A symbol $d_4$ indicates the diameter of the electron beam passage aperture of the second grid 05 on the side of the first accelerating electrode 06, $d_1$ the diameter of the electron beam passage aperture of the first accelerating electrode 06 on the side of the second grid 05, $d_5$ the diameter of the electron beam passage aperture of the first accelerating electrode 06 on the side of the first member of focus electrode 07-1, D the diameter of the aperture of the main lens, $L_1$ the length of the first accelerating electrode 06, $d_2$ the spacing between the first accelerating electrode 06 and the first member of focus electrode 07-1, $L_2$ the length of the first member of focus electrode 07-1, $d_3$ the spacing between the first member of focus electrode 07-1 and the second member of focus electrode 07-2, L3 the length of the second member of focus electrode 07-2, L the sum of the length $L_2$ of the first member of focus electrode 07-1, the length $L_3$ of the second member of focus electrode 07-2, and the spacing $d_3$ therebetween, $L_4$ the sum of the length $L_1$ of the first accelerating electrode 06, the length $L_2$ of the first member of focus electrode 07-1, the spacing $d_2$ therebetween, the length $L_3$ of the second member of focus electrode 07-2, and the spacing $d_3$ between the first member of focus electrode 07-1 and the second member of focus electrode 07-2, $V_f$ a focus voltage, Eb an accelerating voltage, and Vd a voltage which changes in synchronization with deflection of an electron beam.

In the electron gun of the aforementioned constitution, the sum L of the length $L_2$ of the first member of focus electrode 07-1, the length $L_3$ of the second member of focus electrode 07-2, and the spacing d3 therebetween exceeds 1.1 times the diameter D of the aperture of the main lens and the sum $L_4$ of the length $L_1$ of the first accelerating electrode 06, the length $L_2$ of the first member of focus electrode 07-1, the spacing $d_2$ therebetween the length $L_3$ of the second member of focus electrode 07-2, and the spacing $d_3$ between the first member of focus electrode 07-1 and the second member of focus electrode 07-2 is within the range from 4 to 5.4 times the diameter D of the aperture of the main lens.

The diameter $d_4$ of the electron beam passage aperture of the second grid 05 on the side of the first accelerating electrode 06 and the diameter $d_1$ of the electron beam passage aperture of the first accelerating electrode 06 on the side of the second grid 05 are very small compared with the diameter D of the aperture of the main lens.

It is well known that main factors which determine the electron beam spot diameter (hereinafter, it may be referred to as just a beam spot diameter) are space charge effect, thermal initial velocity spread, and spherical aberration of a main lens.

The maximum diameter of an electron beam spread in the main lens traveling from the cathode toward the phosphor screen (hereinafter, it may be referred to as just a beam diameter in the main lens) is related with the beam spot diameters determined by the two aforementioned factors respectively as described below. When the beam diameter in the main lens is denoted in the abscissa and the beam spot diameter is denoted in the ordinate, the beam spot diameter determined by the spherical aberration of the main lens draws a right upward curve which increases as the beam diameter in the main lens increases and the beam spot diameter determined by the space charge effect and thermal initial velocity spread draws a right downward curve which decreases as the beam diameter in the main lens increases.

The relationship between the beam diameter in the main lens and the beam spot diameter determined by the two aforementioned factors is obtained by combining the beam spot diameters determined by the two aforementioned factors respectively and indicated by a quadratic-like curve which initially decreases and then increases as the beam diameter in the main lens increases. Therefore, there exists an optimum beam diameter in the main lens which minimizes the beam spot diameter determined by the two aforementioned factors. The beam diameter in the main lens which minimizes the beam spot diameter determined by the two aforementioned factors varies with the current emitted from the cathode. For an electron gun of a color cathode ray tube, the length of each electrode is optimized so that the beam diameter in the main lens minimizes of nearly minimizes the beam spot diameter determined by the two aforementioned factors in a large beam current region.

In an electron gun of the aforementioned constitution, the accelerating voltage Eb which is the highest voltage is applied to the first accelerating electrode, so that an electron lens having a very strong focusing action is formed between the first electrode means and the first accelerating electrode. Therefore, a small crossover can be formed even in the large beam current region. The electron beam in the main lens after forming crossover spreads nearly to the beam diameter in the main lens which minimizes the beam spot diameter determined by the two aforementioned factors, so that the beam spot diameter in the large beam current region can be decreased.

When the length L of the focus electrode is made longer than 1.1 times the diameter D of the aperture of the main lens or the resultant increase in the focus voltage becomes 24% or more of the accelerating voltage, the spherical aberration of the main lens can be decreased. The beam spot diameter can be decreased also in this respect.

SUMMARY OF THE INVENTION

In the aforementioned prior arts, the second electrode means 02 forms a small crossover even in the large beam current region by forming an electron lens having a very strong focusing action between the first electrode means 01 and the second electrode means 02 and spreads the electron beam in the main lens so wide that the beam spot diameter determined by the spherical aberration of the main lens, space charge effect, and thermal initial velocity spread is minimized in the large beam current region, so that the focus characteristic in the large beam current region is improved. However, in a small beam current region, the electron beam cannot spread sufficiently in the main lens due to the very strong focusing action of an electron lens formed between the first electrode means 01 and the second electrode means 02 and the beam diameter becomes extremely smaller than one for minimizing the beam spot diameter determined by the spherical aberration of the main lens, space charge effect, and thermal initial velocity spread in the small beam current region. As a result, a problem arises that the beam spot diameter increases.

An object of the present invention is to solve the problem of the prior arts mentioned above and to provide a color cathode ray tube having an electron gun which reduces the spot beam diameter in a small beam current region without increasing the beam spot diameter in a large beam current region and can provide a good focus characteristic over the entire beam current region.

To accomplish the above object, the present invention provides a color cathode ray tube having an electron gun comprising a first electrode means for generating an electron beam and directing the electron beam toward the phosphor screen and a second electrode means for constituting the main lens for focusing the electron beam onto the phosphor screen, wherein the second electrode means comprises a first accelerating electrode, a focus electrode, and a second accelerating electrode arranged toward the phosphor screen from the first electrode means in the order named, and the length of the focus electrode is at least two times the diameter of the main lens formed by the second electrode means, and the highest voltage is applied on the first accelerating electrode and the second accelerating electrode, and a voltage lower than the highest voltage is applied on the focus electrode, and the length of the first accelerating electrode is set within the range from about 0.4 to 2 times the diameter of the electron beam passage aperture formed in the surface of the first accelerating electrode opposite to the first electrode means.

DETAILED DESCRIPTION OF THE PREFERRED EMBODIMENTS

When the length of the first accelerating electrode is within the range from about 0.4 to 2 times the diameter of the electron beam passage aperture formed in the surface of the first accelerating electrode which is opposite to the first electrode means, the beam spot diameter in a small beam current region can be decreased with little increase in the beam spot diameter in a large beam current region. The reason is described below.

The relationship between the space charge effect, thermal initial velocity spread, and spherical aberration of the main lens which are main factors in determining the beam spot diameter and the beam diameter in the main lens is as described above.

Figure 19:
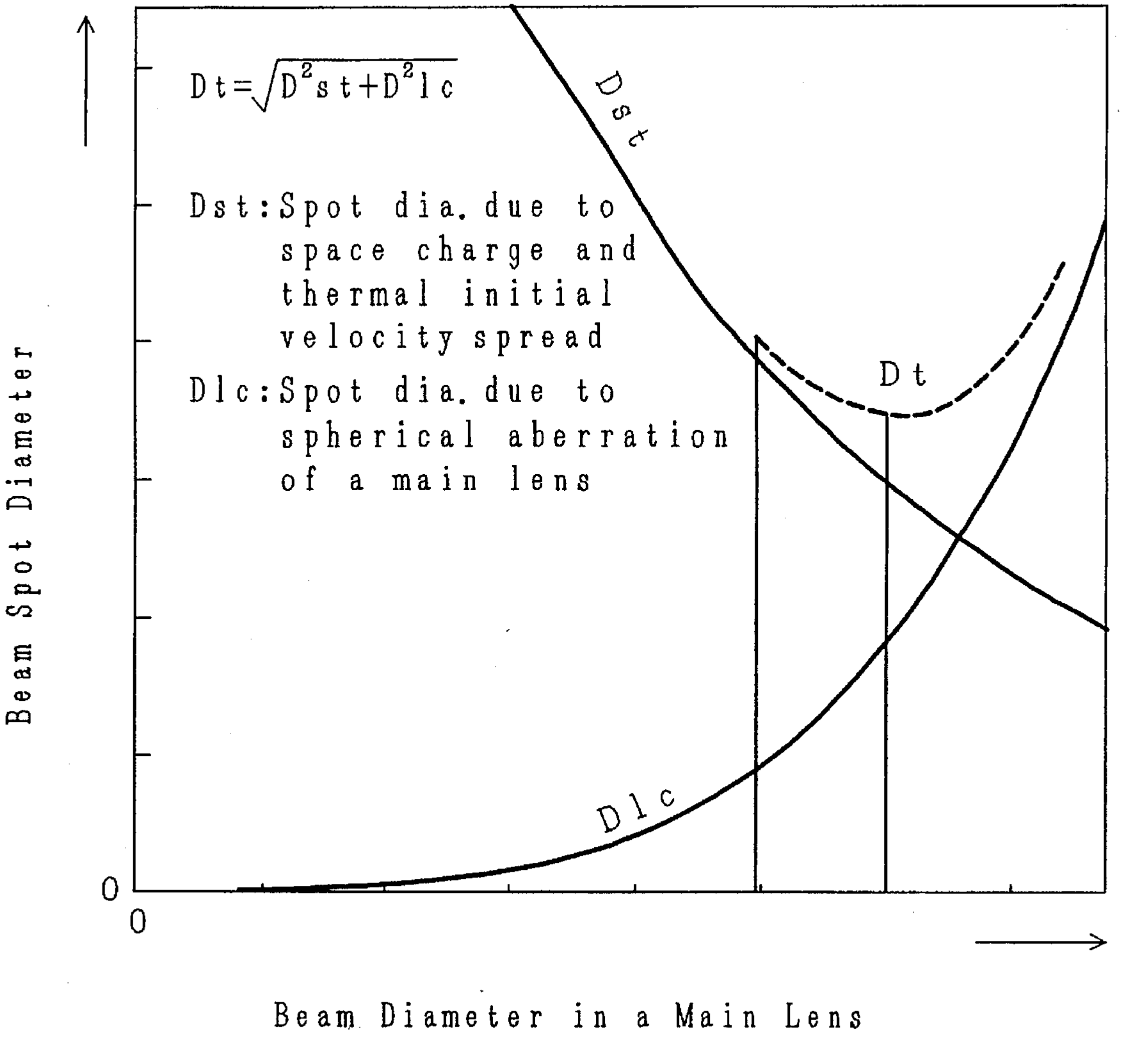
FIG. 19 is a diagram for explaining the relationship between the maximum electron beam diameter in the main lens and the beam spot diameter.

For example, FIG. 19 shows graphs indicating the aforementioned relationship. A curve Dst indicates the relationship between the beam diameter B in a main lens and the beam spot diameter determined by the space charge effect and thermal initial velocity spread, and a curve Dlc indicates the relationship between the beam diameter B in the main lens and the beam spot diameter determined by the spherical aberration of the main lens, and a curve Dt indicates the relationship between the beam diameter B in the main lens and the beam spot diameter determined by the space charge effect, thermal initial velocity spread, and spherical aberration of the main lens.

In case of a conventional electron gun which is optimized so that the beam diameter B in the main lens in the large beam current region becomes optimum, in a small beam current region, for 0.5 mA of the beam current emitted from a cathode, for example, the beam diameter in the main lens is considerably smaller than the optimum beam diameter in the main lens which is obtained from the curve indicating the relationship between the beam diameter in the main lens and the beam spot diameter determined by the space charge effect, thermal initial velocity spread, and spherical aberration of the main lens in the small beam current region. The beam diameter is at the right downward steep slope of the curve Dt indicating the relationship between the maximum electron beam diameter in the main lens and the beam spot diameter determined by the space charge effect, thermal initial velocity spread, and spherical aberration of the main lens in the small beam current region. As a result, when the beam diameter in the main lens in the small beam current region is increased, the beam spot diameter determined by the space charge effect, thermal initial velocity spread, and spherical aberration of the main lens can be reduced. Namely, the beam spot diameter can be reduced.

As the diameter of the electron beam passage aperture formed in the surface of the first accelerating electrode which is opposite to the first electrode means increases, the beam diameter in the main lens increases. However, it increases in the portion where the curve Dt changes little and the beam spot diameter increases little.

The embodiments of the present invention will be explained in detail hereunder with reference to the accompanying drawings.

Figure 1:
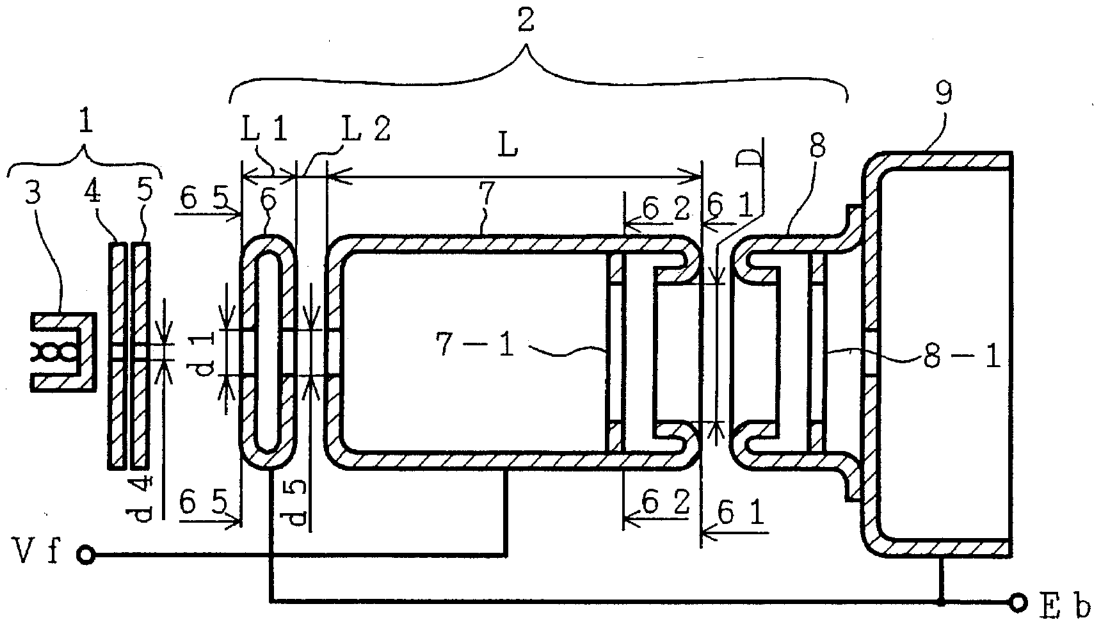
FIG. 1 is a longitudinal cross sectional view of an embodiment of the electron gun for use in the color cathode ray tube of the present invention applied to an in-line type electron gun.
Figure 2:
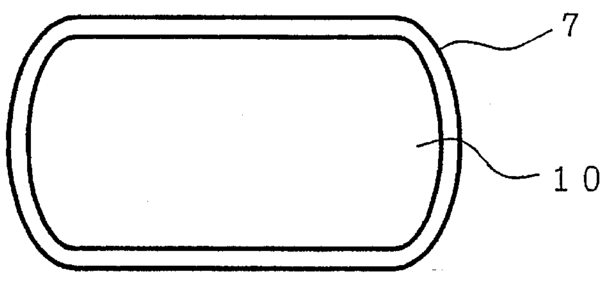
FIG. 2 is a cross sectional view along the line 61—61 shown in FIG. 1.
Figure 3:
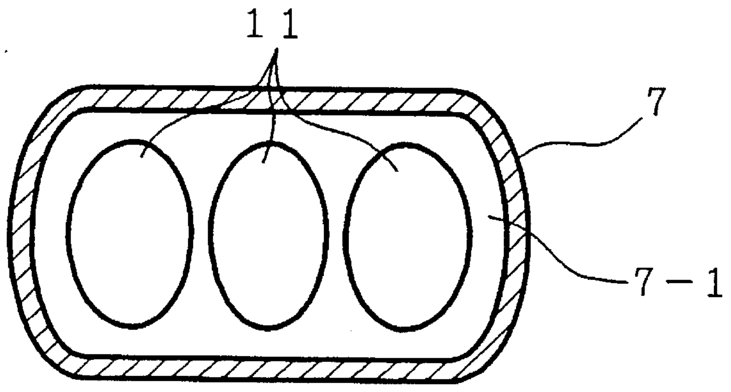
FIG. 3 is a cross sectional view along the line 62—62 shown in FIG. 1.
Figure 4:
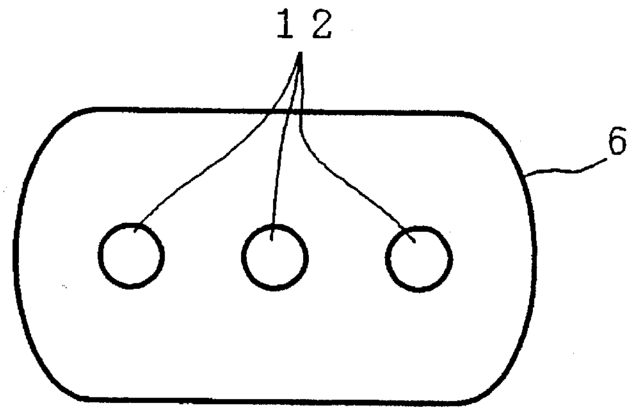
FIG. 4 is a cross sectional view along the line 65—65 shown in FIG. 1.

FIG. 1 is a longitudinal cross sectional view of an embodiment of the electron gun for use in the color cathode ray tube of the present invention applied to an in-line type electron gun, and FIG. 2 is a cross sectional view along the line 61—61 shown in FIG. 1, and FIG. 3 is a cross sectional view along the line 62—62 shown in FIG. 1, and FIG. 4 is a cross sectional view along the line 65—65 shown in FIG. 1.

In each figure, a numeral 1 indicates a first electrode means for generating an electron beam and directing the electron beam toward the phosphor screen, 2 a second electrode means for constituting a main lens for focusing the electron beam onto the phosphor screen, 3 a cathode, 4 the first grid, 5 the second grid, 6 a first accelerating electrode, 7 a focus electrode, 7-1 an electrode plate, 8 a second accelerating electrode, 8-1 an electrode plate, 9 a shield cup, 10 a single opening of the focus electrode which is formed on the side of the second accelerating electrode 8, 11 separate apertures of the electrode plate 7-1 in the focus electrode 7, and 12 an aperture (electron beam passage aperture) of the first accelerating electrode which is formed on the side of the focus electrode 7.

The first electrode means 1 comprises the cathode 3, the first grid 4, and the second grid 5 and the second electrode means 2 comprises the first accelerating electrode (the third grid) 6, the focus electrode (the fourth grid) 7, the electrode plate 7-1, the second accelerating electrode (the fifth grid) 8, and the electrode plate 8-1.

A symbol $d_1$ indicates the diameter of the electron beam passage aperture 12 of the first accelerating electrode 6 on the side of the second grid 5, D the diameter of the aperture of the main lens, L the length of the focus electrode 7, $L_1$ the length of the first accelerating electrode 6, $L_2$ the spacing between the first accelerating electrode 6 and the focus electrode 7, $L_3$ the sum of the length L of the focus electrode 7, the length $L_1$ of the first accelerating electrode 6, and the spacing $L_2$ between the first accelerating electrode 6 and the focus electrode 7, $V_f$ a focus voltage, and Eb an accelerating voltage.

The first electrode means 1 comprises the cathode 3, the first grid 4, and the second grid 5 and the second electrode means 2 comprises the first accelerating electrode 6, the focus electrode 7, and the second accelerating electrode 8, and the length L of the focus electrode 7 is at least 2 times the diameter D of the aperture of the main lens. However, as the length L of the focus electrode 7 increases, the focus voltage $V_f$ also increases, so that it is impossible to lengthen the length L of the focus electrode 7 without any restriction. The length L of the focus electrode 7 is limited so that the focus voltage does not exceed 10 kV in consideration of the dielectric strength of the cathode ray tube socket.

The reason that the length L of the focus electrode is set to at least 2 times the diameter D of the aperture of the main lens is as shown below.

Figure 5:
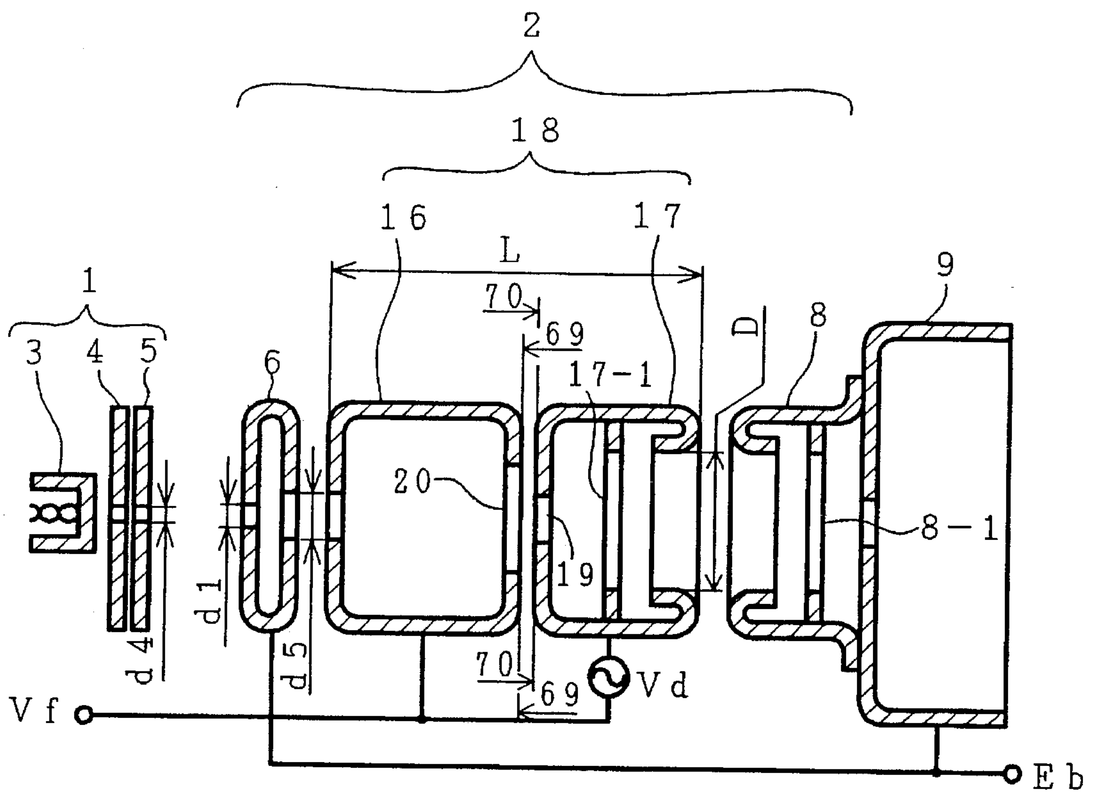
FIG. 5 is an axial cross sectional view of another embodiment of the electron gun for use in the color cathode ray tube of the present invention applied to an electron gun which is focused dynamically.
Figure 6:
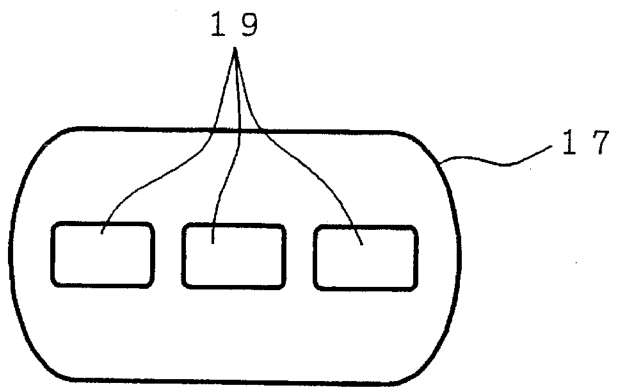
FIG. 6 is a cross sectional view along the line 70—70 shown in FIG. 5.
Figure 7:
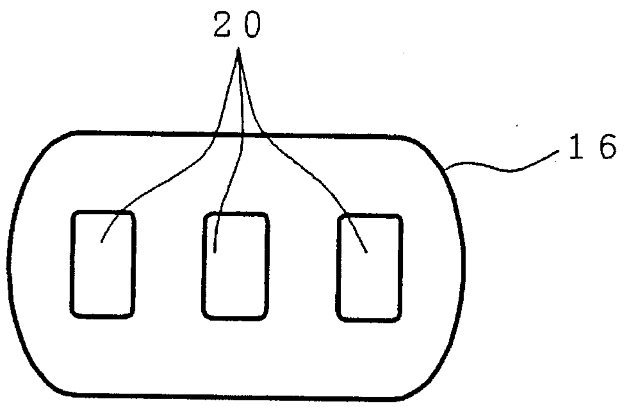
FIG. 7 is a cross sectional view along the line 69—69 shown in FIG. 5.

FIG. 5 is an axial cross sectional view of an electron gun which is focused dynamically, and FIG. 6 is a cross sectional view along the line 70—70 shown in FIG. 5, and FIG. 7 is a cross sectional view along the line 69—69 shown in FIG. 5. A numeral 18 indicates a focus electrode, 16 a first member of the focus electrode 18, 17 a second member of the focus electrode 18, 19 a horizontally elongated aperture formed in the second member 17 of the focus electrode 18, and 20 a vertically elongated aperture formed in the first member 16 of the focus electrode 18.

As shown in the figure, in an electron gun in which a voltage $V_d$ which varies in synchronization with deflection of the electron beam is superposed with a focus voltage $V_f$, that is, a so-called dynamic focus type electron gun, to eliminate astigmatism of the electron beam spot due to deflection, it is necessary to form at least one non-axially-symmetric electron lens between a first member 16 and a second member 17 of the focus electrode 18 which is divided into at least two members (in this case, the first member 16 and the second member 17).

For that purpose, it is necessary that the length L of the focus electrode 18 is set to at least 2 times the diameter D of the aperture of the main lens. To eliminate the effect of the electric field of an electron lens (main lens) formed between the focus electrode 7 and the second accelerating electrode 8 on an electron lens formed between the first accelerating electrode 6 and the focus electrode 7, it is necessary that the length is at least 2 times the diameter D of the aperture of the main lens.

The accelerating voltage $E_b$ which is the highest voltage is applied on both of the first and second accelerating electrodes 6 and 8 and the focus voltage $V_f$ which is lower than the accelerating voltage ($E_b$) is applied on the focus electrodes 7 and 18.

The lens diameter D of the main lens is defined as follows: Namely, in the structure of a main lens which is disclosed in Japanese Patent Application Laid-Open SHO 58-103752, that is, in a main lens having a structure in which electrodes having a single horizontally elongated opening and having an electrode plate with a separate aperture for each electron beam inside the electrodes are arranged opposite to each other as shown in FIGS. 1 to 4, the lens diameter D of the main lens is the length of the minor axis of the single opening of the focus electrode. The reason is that in a main lens formed by a non-circular electrode as shown in FIG. 1, the lens diameter in the vertical direction is determined by the length of the minor axis of the single opening, that is, the vertical opening diameter.

The lens diameter in the horizontal direction can be made effectively equal to the vertical opening diameter by the effect of the electrode plate having a non-circular opening and placed inside the electrode and the lens diameter in each direction can be balanced.

Figure 20:
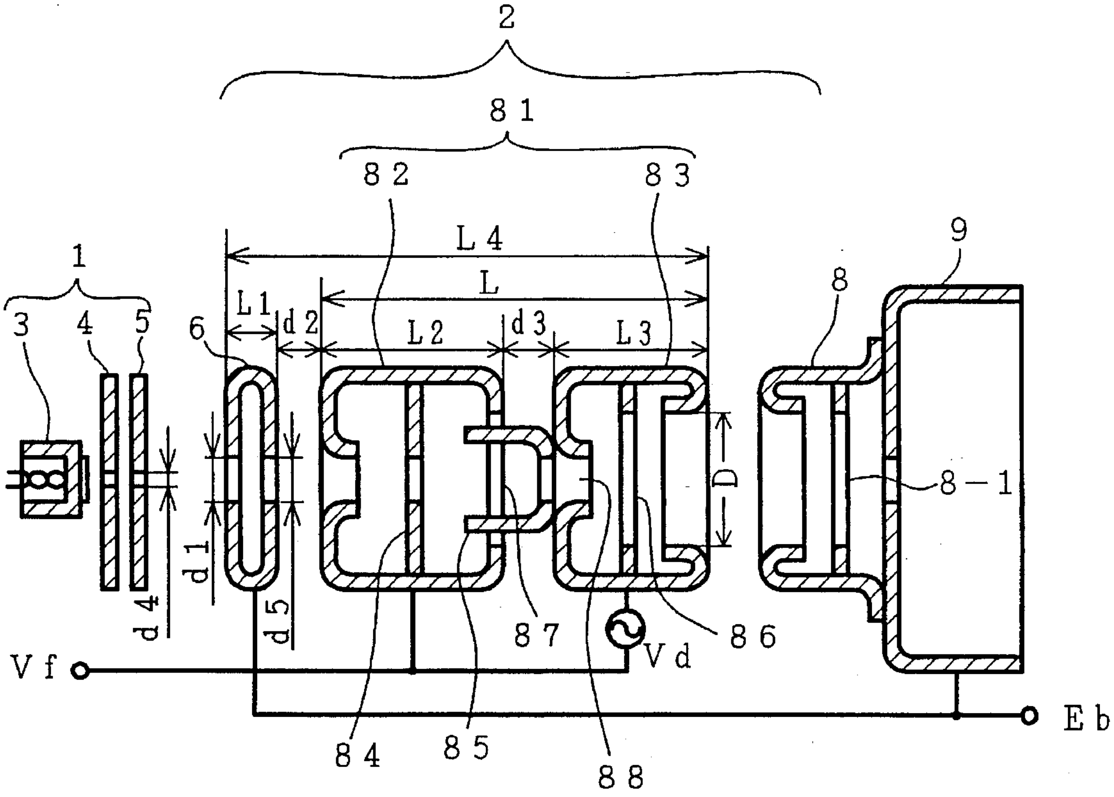
FIG. 20 is an axial cross sectional view of another embodiment of the electron gun for use in the color cathode ray tube of the present invention applied to an electron gun which is focused dynamically.

As an electron gun for focusing dynamically, if, instead of using the first member 16 and the second member 17 of the focus electrode 18 shown in FIG. 5, as shown in FIG. 20, a non-axially-symmetric electron lens is formed by forming a single opening 87 in the surface of a first member 82 of a focus electrode 81 which is opposite to a second member 83 of the focus electrode 81, forming an electron beam passage aperture 88 for each electron beam in the surface of the second member 83 which is opposite to the first member 82, and attaching a pair of correction electrode plates 85 which are parallel to each other above and under the electron beam passage aperture 88, the same effect as that in the embodiment shown in FIG. 5 can be obtained. Numerals 84 and 86 indicate electrode plates in which electron beam passage apertures are formed.

Figure 8:
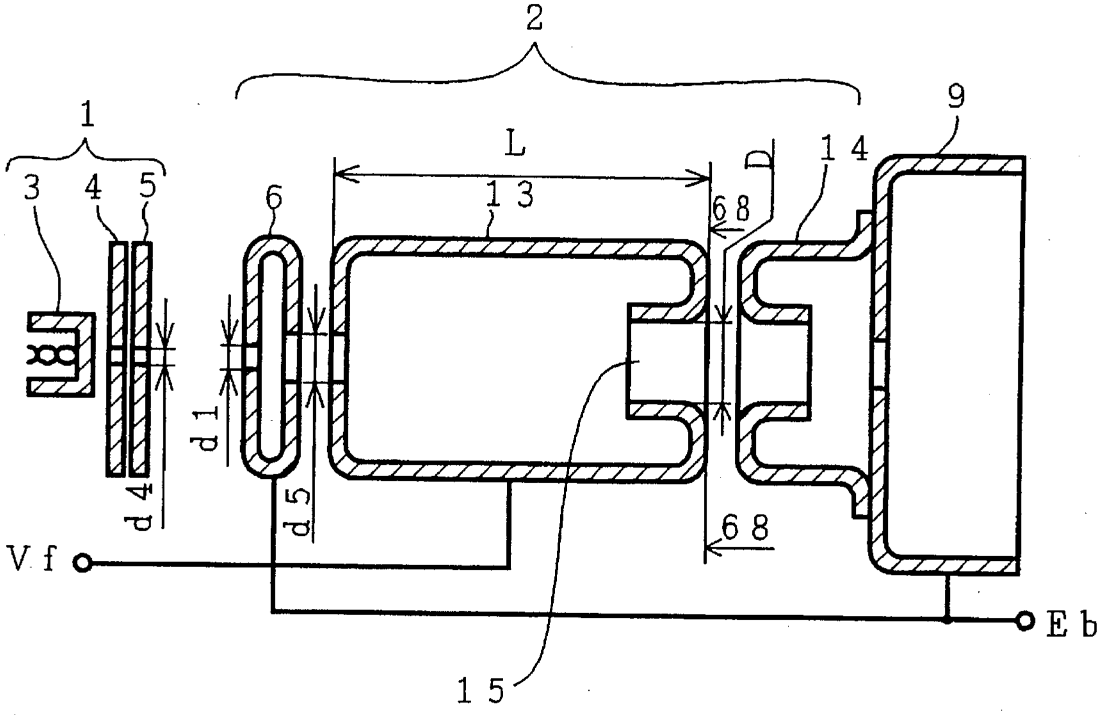
FIG. 8 is an axial cross sectional view of another embodiment of the electron gun for use in the color cathode ray tube of the present invention applied to an in-line type electron gun having a main lens of a circular aperture.
Figure 9:
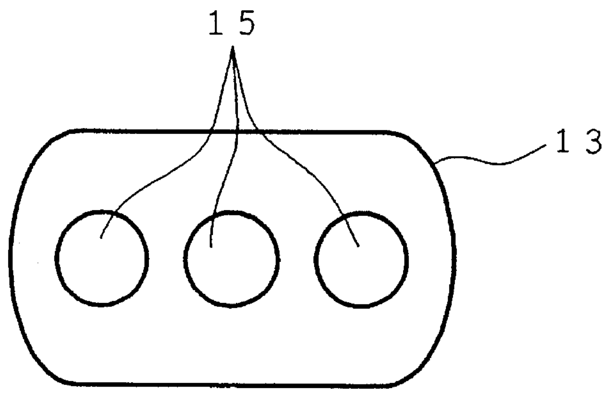
FIG. 9 is a cross sectional view along the line 68—68 shown in FIG. 8.

Furthermore, when an electron gun having the constitution shown in FIGS. 8 and 9 is used, the lens diameter of the main lens is the opening of the focus electrode.

FIG. 8 is an axial cross sectional view of an in-line type electron gun having a main lens of a circular aperture and FIG. 9 is a cross sectional view along the line 68—68 shown in FIG. 8. A numeral 13 indicates a focus electrode and 15 indicates an electron beam passage aperture which is formed in the focus electrode 13.

The lens diameter D of a main lens having a structure that circular apertures (the electron beam passage apertures 15) as shown in the figure are arranged opposite to each other is the diameter of the opening of the focus electrode.

Figure 10:
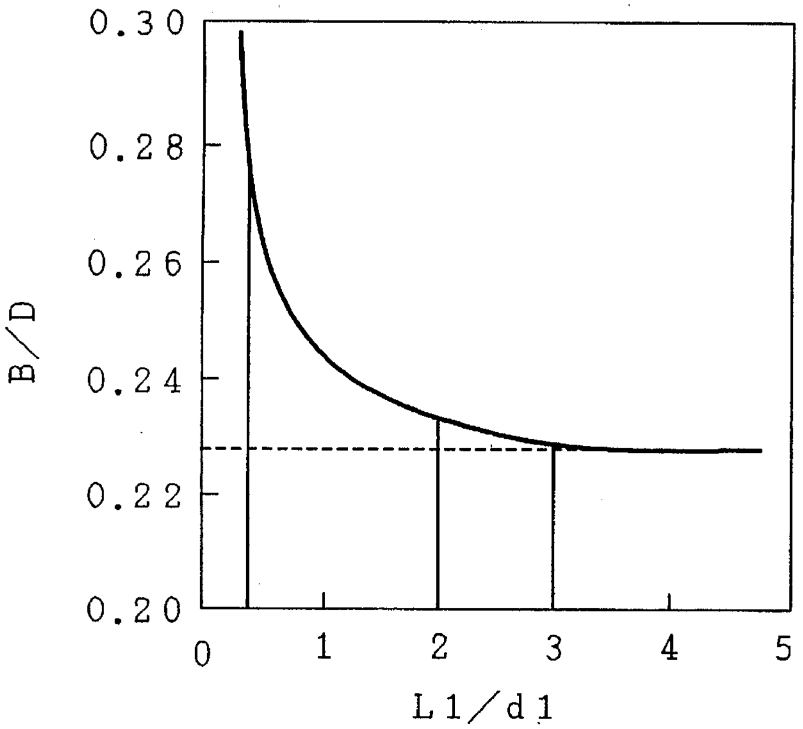
FIG. 10 is a diagram for explaining the relationship between the ratio of the maximum electron beam diameter in the main lens to the aperture diameter of the main lens and the ratio of the length of the first accelerating electrode to the aperture diameter of the first accelerating electrode in a large beam current region.
Figure 11:
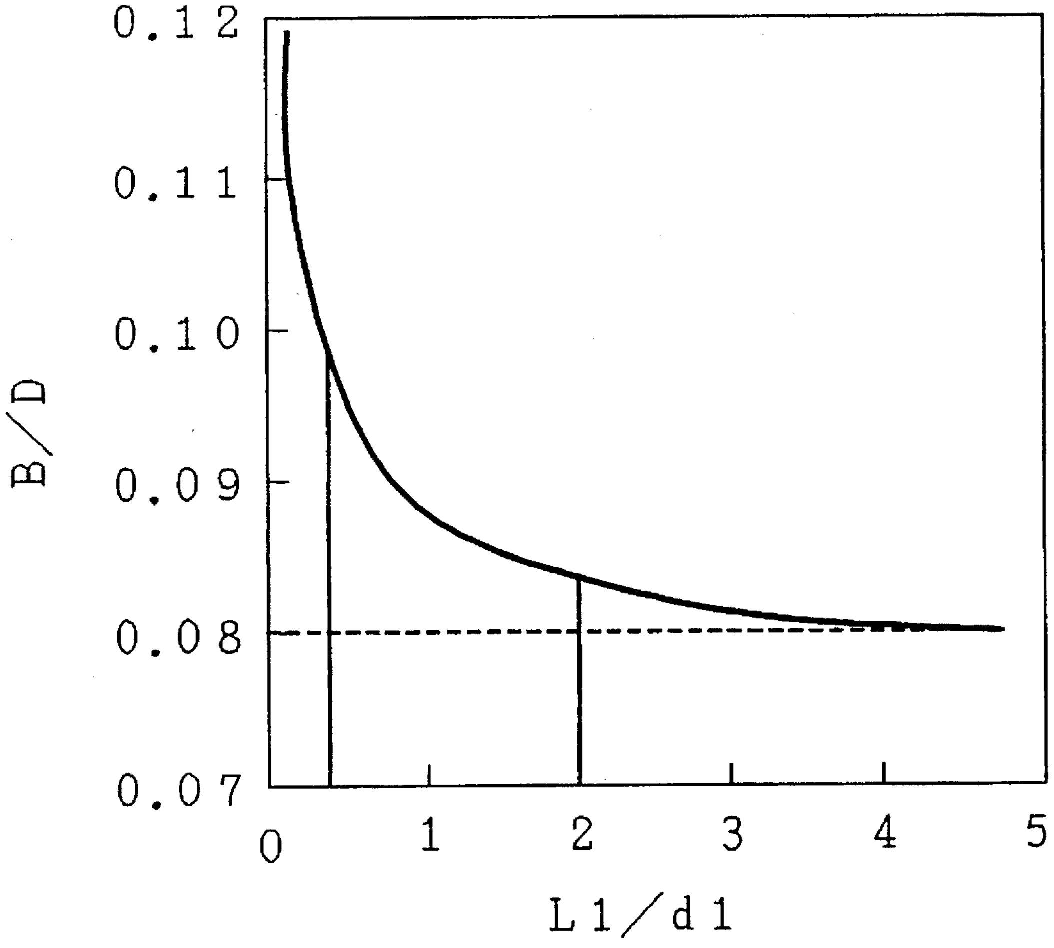
FIG. 11 is a diagram for explaining the relationship between the ratio of the maximum electron beam diameter in the main lens to the aperture diameter of the main lens and the ratio of the length of the first accelerating electrode to the aperture diameter of the first accelerating electrode in a small beam current region.

FIG. 10 is a diagram for explaining the relationship between the ratio of the maximum electron beam diameter B in the main lens to the lens diameter D of the main lens and the ratio of the length $L_1$ of the first accelerating electrode to the aperture $d_1$ of the first accelerating electrode in a large beam current region and FIG. 11 is a diagram for explaining the relationship between the ratio of the maximum electron beam diameter B in the main lens to the lens diameter D of the main lens and the ratio of the length $L_1$ of the first accelerating electrode to the aperture $d_1$ of the first accelerating electrode in a small beam current region. The ratio $L_1/d_1$ of the length $L_1$ of the first accelerating electrode 6 to the diameter $d_1$ of the electron beam passage aperture 12 which is formed for each electron beam in the surface of the first accelerating electrode 6 which is opposite to the second grid 5 is indicated in the horizontal axis and the ratio B/D of the maximum electron beam diameter B in the main lens to the lens diameter D of the main lens is indicated in the vertical axis so as to indicate the relationship between them.

In this case, the lens diameter D of the main lens is 10.4 mm. The distance from the surface of the first accelerating electrode 6 in which the electron beam passage aperture opposite to the first electrode means 1 is formed to the surface of the first accelerating electrode 6 in which the electron beam passage aperture opposite to the focus electrodes 7, 18, and 13 is formed is defined as the length $L_1$ of the first accelerating electrode. As the ratio $L_1/d_1$ of the length $L_1$ to the diameter $d_1$ increases, the ratio B/D of the maximum electron beam diameter B in the main lens to the lens diameter D of the main lens decreases continuously and converges to about 0.23 in the large beam current region and to about 0.08 in the small beam current region.

When the ratio $L_1/d_1$ is 2, the ratio B/D is about 1.05 times the aforementioned converged value. When the ratio $L_1/d_1$ is more than 2, it can be considered that the ratio B/D is almost converged. Therefore, in the range of the ratio $L_1/d_1$ larger than 2, it is extremely difficult to enlarge the electron beam diameter in the main lens. Therefore, to reduce the beam spot diameter in the small beam current region, it is necessary to reduce the ratio $L_1/d_1$ to 2 or less.

In the range of the ratio $L_1/d_1$ of the length $L_1$ to the aperture $d_1$ smaller than 0.4, on the other hand, there is a problem imposed that the beam spot diameter abruptly increases in the large beam current region. The reason is as shown below.

Figure 12:
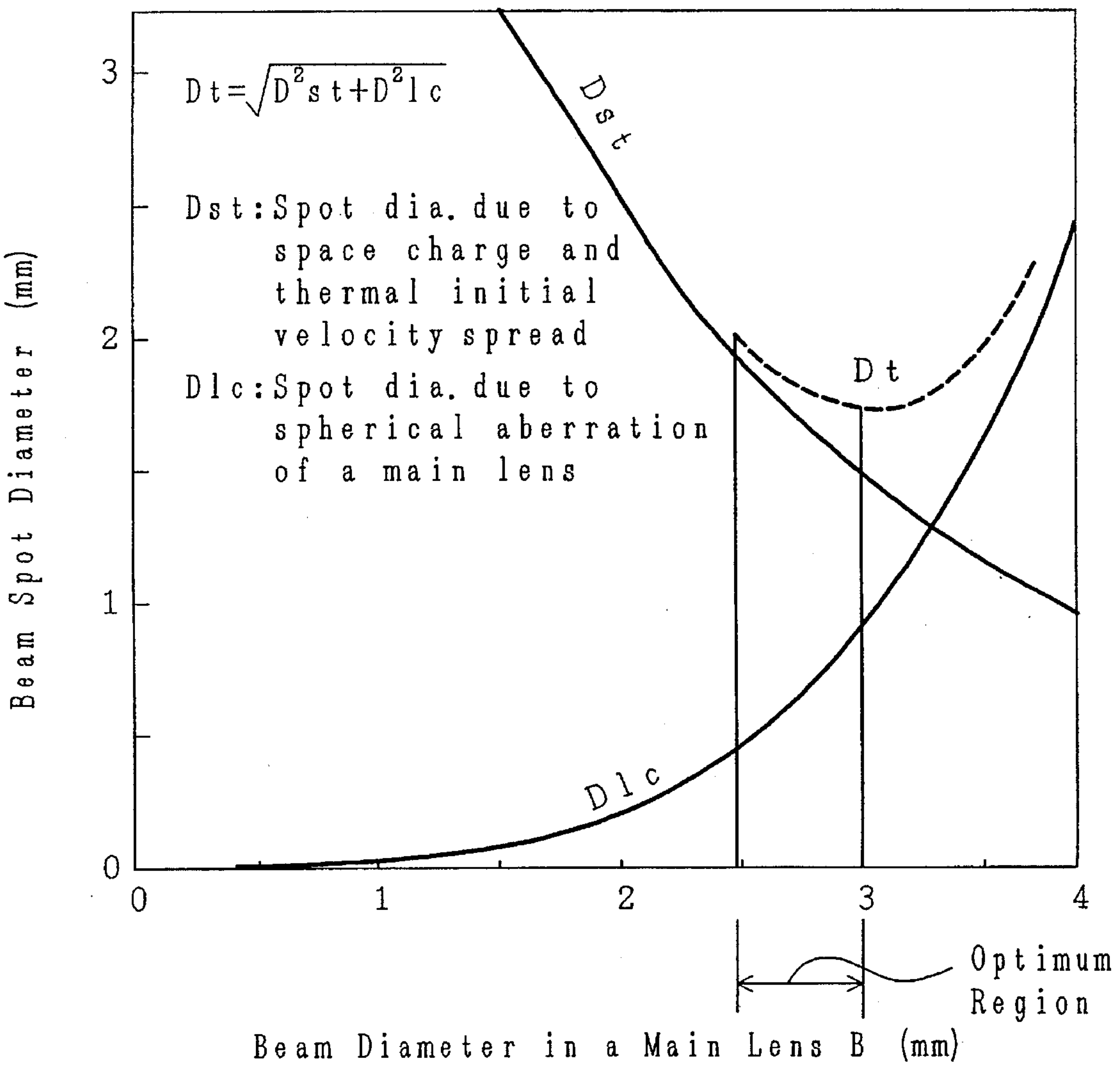
FIG. 12 is a diagram for explaining the relationship between the maximum electron beam diameter in the main lens and the beam spot diameter in a large beam current region when the aperture diameter of the main lens is 10.4 mm.

FIG. 12 is a diagram for explaining the relationship between the maximum electron beam diameter in the main lens and the beam spot diameter in the large beam current region (in this case, the current emitted from a cathode is 4 mA) in a color picture tube having an in-line type electron gun with the lens diameter of the main lens being 10.4 mm and indicates the relationship between the maximum electron beam diameter B (mm) in the main lens and the beam spot diameter (mm) in the large beam current region.

In the figure, $D_{1c}$ indicates the relationship between the maximum beam diameter in the main lens and the beam spot diameter determined by the spherical aberration of the main lens and $D_{st}$ indicates the relationship between the maximum electron beam diameter in the main lens and the beam spot diameter determined by the space charge effect and thermal initial velocity spread. $D_t$ indicates the relationship between the maximum electron beam diameter in the main lens and the beam spot diameter obtained by combining $D_{1c}$ and $D_{st}$.

In the figure, the beam diameter in the main lens is chosen within the range situated on the left hand of the beam diameter at which the curve $D_t$ shows the minimum value in the large beam current region and the electron gun is optimized so that the maximum electron beam diameter in the main lens is particularly within the range where the curve Dt varies only a little, concretely within the range from 2.4 mm to 3 mm or within the range from about 0.23 to 0.28 in terms of the ratio of B/D in FIG. 12.

When the beam diameter is taken within the aforementioned range, even if the beam current increases further and the maximum electron beam diameter in the main lens increases, an increase of the beam spot diameter can be limited.

However, if the electron gun should be optimized within the range on the right hand of the beam diameter at which the curve Dt shows the minimum value, when the beam current increases furthermore, the beam spot diameter will increase remarkably.

Therefore, to reduce the beam spot diameter in the small beam current region without increasing the beam spot diameter in the large beam current region, it is necessary to set the ratio $L_1/d_1$ to at least 0.4. When $L_1/d_1=0.4$, B/D is about 0.28.

From the aforementioned, it is desirable that the length $L_1$ of the first accelerating electrode is within the range from 0.4 to 2 times the diameter $d_1$ of the electron beam passage aperture for each electron beam formed in the surface of the first accelerating electrode which is opposite to the second grid.

It is desirable that the diameter $d_1$ of the electron beam passage aperture for each electron beam formed in the surface of the first accelerating electrode which is opposite to the second grid is equal to or less than the diameter $d_5$ of the electron beam passage aperture for each electron beam formed in the surface of the first accelerating electrode which is opposite to the focus electrode for convenience of inserting a mandrel into the apertures during assembling an electron gun.

In the above explanation, an example of an in-line type electron gun with the aperture of the main lens being 10.4 mm is used. Needless to say, the same may be said with a single-beam electron gun used for a projection type cathode ray tube as shown in FIG. 13 which will be explained below.

Figure 13:
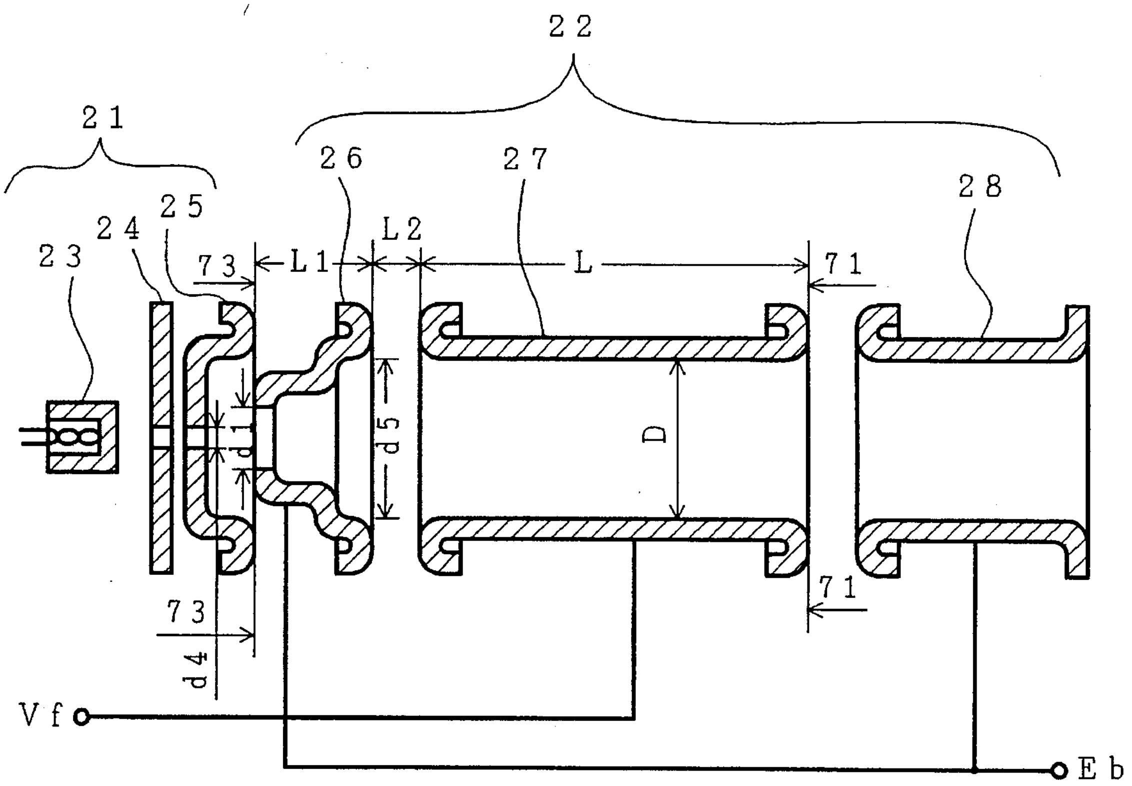
FIG. 13 is an axial cross sectional view of an electron gun for explaining another embodiment of the color cathode ray tube of the present invention.
Figure 14:
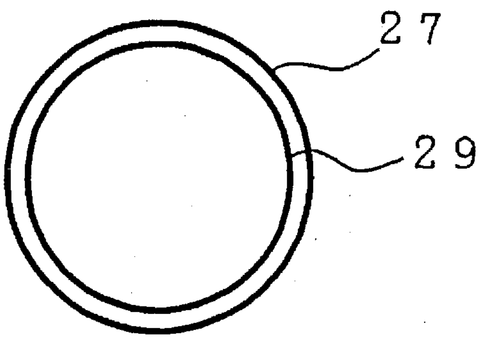
FIG. 14 is a cross sectional view along the line 71—71 shown in FIG. 13.
Figure 15:
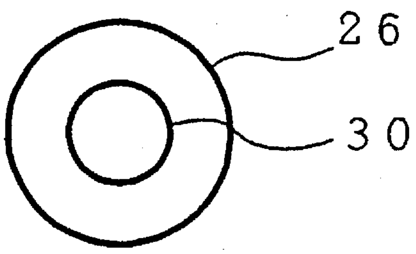
FIG. 15 is a cross sectional view along the line 73—73 shown in FIG. 13.

FIG. 13 is an axial cross sectional view of an electron gun illustrating another embodiment of the color cathode ray tube of the present invention, and FIG. 14 is a cross sectional view along the line 71—71 shown in FIG. 13, and FIG. 15 is a cross sectional view along the line 73—73 shown in FIG. 13. The figures show an example in which the present invention is applied to an electron gun for projection type cathode ray tube.

In the figures, a numeral 21 indicates a first electrode means, 22 a second electrode means, 23 a cathode, 24 the first grid, 25 the second grid, 26 a first accelerating electrode, 27 a focus electrode, 28 a second accelerating electrode, and 29 and 30 single openings.

The dimensions indicated below are for the embodiment of the in-line type electron gun of the present invention explained above and the focus characteristics are evaluated.

Lens diameter D of main lens: 10.4 mm

Length L of a focus electrode: 39 mm

Spacing $L_2$ between the electrodes: 1.2 mm

Length $L_1$ of the first accelerating electrode: 2.1 mm

Diameter $d_1$ of the aperture of the first accelerating electrode: 4 mm

A cathode ray tube having an experimental electron gun of the above dimensions incorporated therein and having a screen diagonal of 76 cm produced good results that the beam spot diameter is equal to that with a conventional electron gun in the large beam current region and considerably better than that with the conventional electron gun in the small beam current region and that the beam spot diameter is smaller in the large beam current region compared with electron guns having different constitutions and equivalent to or better than that with those electron guns in the small beam current region.

Figure 16:
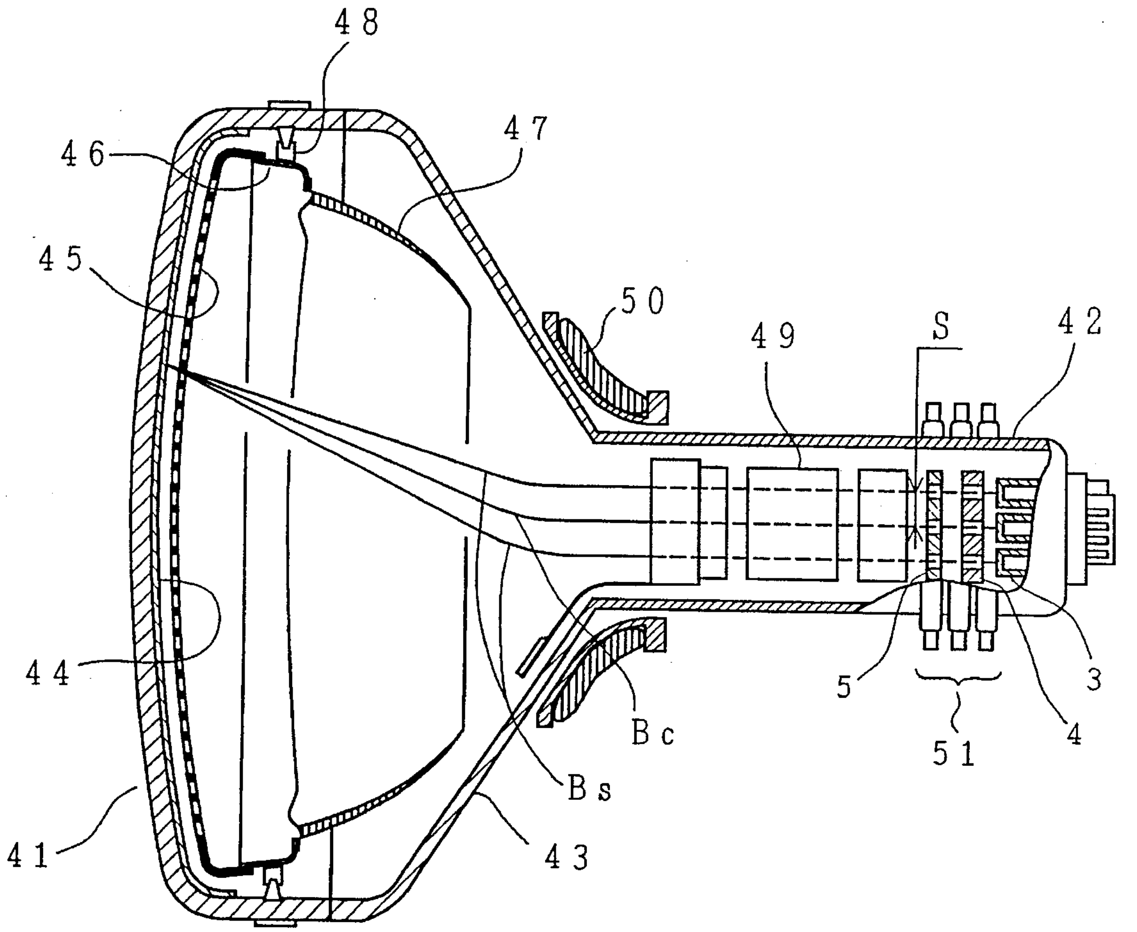
FIG. 16 is a cross sectional schematic diagram for explaining the whole constitution of an embodiment of the color cathode ray tube of the present invention.
Figure 17:
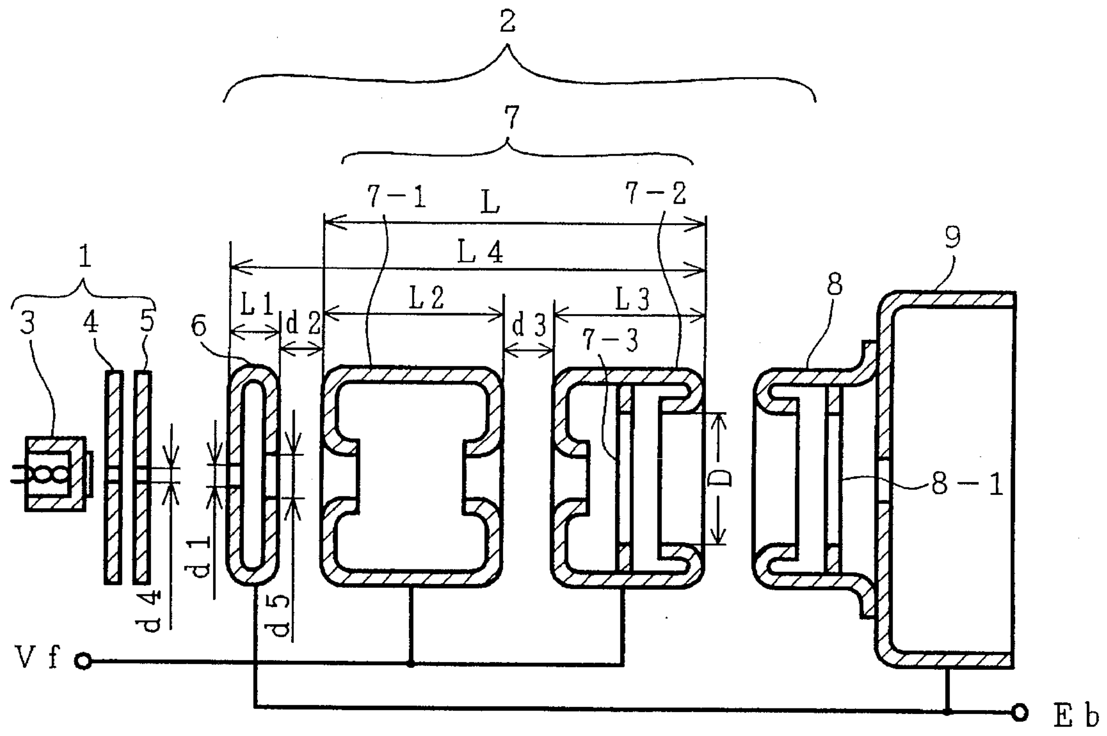
FIG. 17 (PRIOR ART)
FIG. 17 is an axial cross sectional view of an electron gun for use in a conventional color cathode ray tube viewed in a direction of the in-line arrangement for comparison of focus voltage application schemes.
Figure 18:
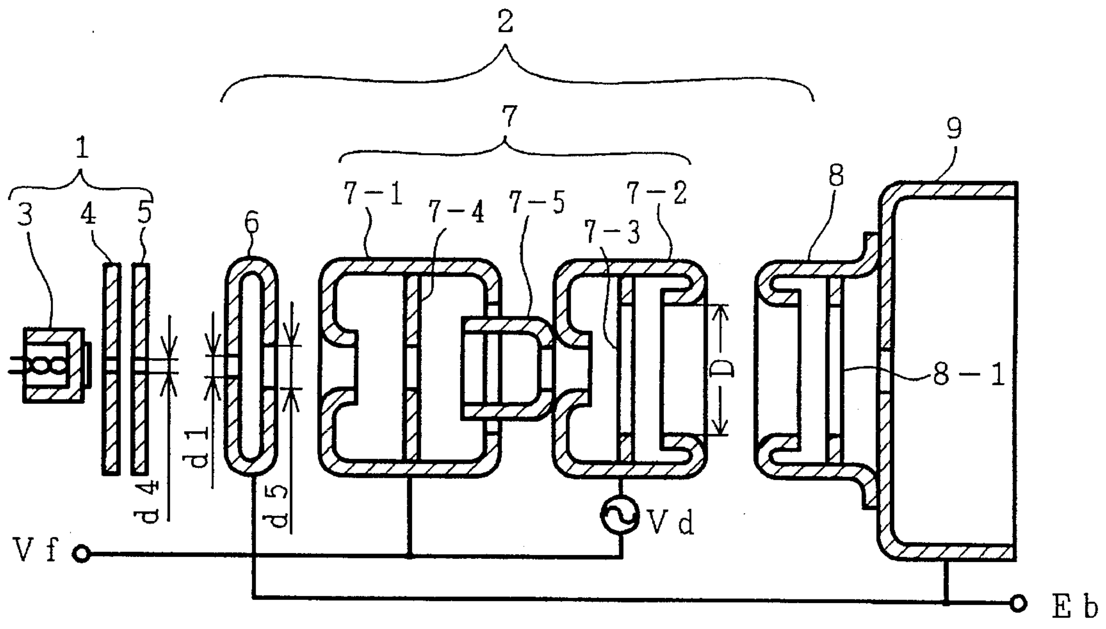
FIG. 18 (PRIOR ART)
FIG. 18 is an axial cross sectional view of an electron gun for use in a conventional color cathode ray tube viewed in a direction of the in-line arrangement for comparison of focus voltage application schemes.

FIG. 16 is a cross sectional schematic diagram for explaining the whole constitution of an embodiment of the color cathode ray tube of the present invention. A numeral 41 indicates a panel, 42 a neck, 43 a funnel, 44 a mosaic three-color phosphor screen, 45 a shadow mask, 46 a shadow mask frame, 47 a magnetic field, 48 a shadow mask suspending mechanism, 49 an electron gun, 50 a deflection yoke, and 51 an external magnetic device for centering and adjustment of purity.

The electron gun 49 comprises a first electrode means for generating a plurality of electron beams and directing these electron beams toward the phosphor screen along the initial paths parallel with each other at an interval of S in a plane and a second electrode means which constitutes a main lens for focusing each aforementioned electron beam onto the phosphor screen. It is desirable that the aforementioned aperture diameter $d_1$ is set to be smaller than the beam interval S.

In the figure, three electron beams Bs, Bc, and Bs emitted from the electron gun 49 are deflected in the horizontal and vertical directions by the deflection yoke 50 which are externally installed in the transitional region of the neck 42 and the funnel 43 and strike the phosphor screen 44.

The shadow mask 45 which serves as a color selection electrode is installed in front of the phosphor screen 44 and each of the three electron beams from the electron gun 49 is selected by the shadow mask 45 so that it lands at a phosphor of an intended color.

Each of the three electron beams is modulated by a video signal of each color which is applied externally on the electron gun and reproduces an intended color image on the phosphor screen.

When the electron gun of the aforementioned constitution is installed into a cathode ray tube as the electron gun 49 shown in FIG. 16, good focus characteristics can be obtained over the entire beam current region regardless of the amount of the electron beam current.

According to the present invention, as mentioned above, when the length of the first accelerating electrode constituting the electron gun is within the range from 0.4 to 2 times the diameter of the electron beam passage aperture formed in the surface of the first accelerating electrode which is opposite to the first electrode means, the beam spot diameter in the small beam current region can be decreased without increasing the beam spot diameter in the large beam current region, and therefore good focus characteristics can be obtained over the entire beam current region, resulting in a color cathode ray tube having an superior function.

What is claimed is:

1. A color cathode ray tube having an electron gun comprising first electrode means for generating an electron beam and directing said electron beam arranged toward a phosphor screen and second electrode means for constituting a main lens for focusing said electron beam onto said phosphor screen, wherein said second electrode means comprises a first accelerating electrode, a focus electrode, and a second accelerating electrode toward said phosphor screen, and a length of said focus electrode is equal to or longer than two times a diameter of said main lens, and a highest voltage is applied on said first accelerating electrode and said second accelerating electrode, and a voltage lower than said highest voltage is applied on said focus electrode, and a length of said first accelerating electrode is within a range from about 0.4 to 2 times a diameter of an electron beam passage aperture formed in a surface of said first accelerating electrode which is opposite to said first electrode means.

2. A color cathode ray tube according to claim 1, wherein said voltage applied on said focus electrode is equal to or higher than 24% of said highest voltage, but not higher than 10 kV.

3. A color cathode ray tube according to claim 1, wherein said diameter of said electron beam passage aperture of said first accelerating electrode is equal to or smaller than a diameter of an electron beam passage aperture formed in a surface of said first accelerating electrode which is opposite to said focus electrode and is equal to or larger than a diameter of an electron beam passage aperture formed in a surface of said first electrode means which is opposite to said first accelerating electrode.

4. A color cathode ray tube having an electron gun comprising a first electrode means for generating a plurality of electron beams and directing said plurality of electron beams toward a phosphor screen along initial paths parallel with each other in a plans and a second electrode means constituting a main lens for focusing said plurality of electron beams onto said phosphor screen, wherein said second electrode means comprises a first accelerating electrode, a focus electrode, and a second accelerating electrode arranged toward said phosphor screen from said first electrode means, and a length of said focus electrode is equal to or longer than two times a lens diameter of said main lens, and a highest voltage is applied on said first accelerating electrode and said second accelerating electrode, and a voltage lower than said highest voltage is applied on said focus electrode, and a length of said first accelerating electrode is within a range from about 0.4 to 2 times a diameter of an electron beam passage aperture formed in a surface of said first accelerating electrode which is opposite to said first electrode means.

5. A color cathode ray tube according to claim 4, wherein said voltage applied on said focus electrode is equal to or higher than 24% of said highest voltage, but not higher than 10 kV.

6. A color cathode ray tube according to claim 4, wherein said diameter of said electron beam passage aperture of said first accelerating electrode is equal to or smaller than a diameter of an electron beam passage aperture formed in a surface of said first accelerating electrode which is opposite to said focus electrode, and is equal to or larger than a diameter of an electron beam passage aperture formed in a surface of said first electrode means which is opposite to said first accelerating electrode, and is smaller than a shortest distance between center axes of said initial paths.

7. A color cathode ray tube according to claim 4, wherein said focus electrode comprises a first member and a second member arranged opposite to each other in this order toward said phosphor screen with a spacing therebetween, and forms a non-axially-symmetric electron lens between said first member and said second member, and a voltage which changes in synchronization with deflection of an electron beam is superposed on a voltage applied on said second member.

8. A color cathode ray tube according to claim 7, wherein a vertically elongated electron beam passage aperture is formed in a surface of said first member which is opposite to said second member and a horizontally elongated electron beam passage aperture is formed in a surface of said second member which is opposite to said first member.

9. A color cathode ray tube according to claim 7, wherein a single opening is formed in a surface of said first member which is opposite to said second member and electrode plates which are in parallel with each other are placed above and under an electron beam passage aperture formed in a surface of said second member which is opposite to said first member.

* * * * *